(12) United States Patent
Gruse et al.

(10) Patent No.: US 6,173,112 B1
(45) Date of Patent: Jan. 9, 2001

(54) METHOD AND SYSTEM FOR RECORDING IN-PROGRESS BROADCAST PROGRAMS

(75) Inventors: George Gregory Gruse, Lighthouse Point; Kenneth Louis Milsted, Boynton Beach; Marco M. Hurtado, Boca Raton; Glen Edward Hamblin, deceased, late of Boca Raton, all of FL (US), by Patricia Hamblin, legal representative

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/980,459

(22) Filed: Nov. 28, 1997

(51) Int. Cl.⁷ .................................................. H04N 5/91
(52) U.S. Cl. ............................ 386/83; 348/460; 348/906; 348/553; 360/69
(58) Field of Search ....................... 386/83, 95; 358/908; 348/468, 731, 460, 906, 477, 569–570, 1, 2, 553; 360/69; 455/186.1; H04N 5/91

(56) References Cited

U.S. PATENT DOCUMENTS

| | | | |
|---|---|---|---|
| 4,706,121 | * 11/1987 | Young | 358/142 |
| 4,908,707 | * 3/1990 | Kinghorn | 386/83 |
| 5,296,931 | * 3/1994 | Na | 348/731 |
| 5,343,251 | * 8/1994 | Nafah | 348/571 |
| 5,479,266 | * 12/1995 | Young et al. | 386/83 |
| 5,526,127 | * 6/1996 | Yonetani et al. | 358/335 |
| 5,526,130 | * 6/1996 | Kim | 358/335 |
| 5,589,892 | * 12/1996 | Knee et al. | 348/731 |
| 5,657,414 | * 8/1997 | Lett et al. | 386/35 |
| 5,731,844 | * 3/1998 | Rauch et al. | 348/569 |
| 5,734,444 | * 3/1998 | Yoshinobu | 348/731 |
| 5,822,123 | * 10/1998 | Davis et al. | 348/564 |
| 5,844,478 | * 12/1998 | Blatter et al. | 348/474 |
| 5,956,455 | * 9/1999 | Hennig | 386/83 |
| 5,977,964 | * 11/1999 | Willaims et al. | 386/83 |
| 6,075,526 | * 6/2000 | Rothmuller | 348/1 |

OTHER PUBLICATIONS

U.S. application No. 08/979,613, Gruse et al., filed Nov. 28, 1997.
U.S. application No. 08/979,612, Singkornrat et al., filed Nov. 28, 1997.

* cited by examiner

*Primary Examiner*—Wendy Garber
*Assistant Examiner*—Vincent F. Boccio
(74) *Attorney, Agent, or Firm*—Steven J. Meyers; Steven J. Soucar; Fleit, Khan, Gibbons, Gutman & Bongini P.L.

(57) ABSTRACT

In a data communication network wherein broadcasted transmissions include a portion uniquely identifying the content of the following transmission and wherein transmissions are repeated at predetermined intervals, a communication unit for operating within the system includes a receiver, a processor, and memory for storing data and instructions for the processor. The receiver receives transmissions over the communication network. The communication unit receives a record command from a user that causes it to record the audio/video content being broadcasted during a subsequent transmission thereof. The memory includes space for storing the program that causes the communication unit to automatically record the transmission at the time the transmission is re-broadcasted.

14 Claims, 4 Drawing Sheets

METHOD AND SYSTEM FOR RECORDING IN-PROGRESS BROADCAST PROGRAMS

BACKGROUND OF THE INVENTION

The present invention relates to communications networks and computer hardware and software and more specifically to a system for recording broadcasted transmissions.

The evolution of broadcasting systems has resulted in the availability of a great variety of programs available for users. This is specially true in satellite or cable-based subscriber systems wherein the subscriber can select among several program alternatives at many times. Moreover, the Internet, and more specifically the World-Wide Web or simply "the Web," has provided its users with a great choice of program content. The possibilities for programming flexibility arising from global networks providing digital transmissions are still great. The availability of such varied content has also made recorders (such a video tape recorders) very popular. Thus, a subscriber can program such recording apparatus to record programs at announced times. However, it is easy to make mistakes in programming a recording apparatus ahead of time because users may not be as careful as required or may simply not deem the task to be worthy of the time required to program the recorder. Moreover, the subscriber may not be interested in a program until he or she actually begins to view it or listen to it. For example, while listening to a music broadcast or viewing a video broadcast, people often decide to record the program content. Previously, their only choice was to press the record button on their recording device and record the remaining part of the program or to look through a program guide to figure out if and when the program would be broadcasted again. For music broadcasts, a program guide does not usually exist and for video broadcasts it can be troublesome to set up the recording equipment to record the program in a later broadcast. As mentioned above there exist many potential sources of errors in programming a recorder such as setting the incorrect time or channel, or not having the device powered up properly. Accordingly there is a need for a simpler programming system.

BRIEF SUMMARY OF THE INVENTION

Briefly, in accordance with the invention, in a broadcast system wherein at least some programs are broadcasted more than once and wherein the program content can be sent with accompanying data that identify and describe the content before it is played, a recording system provides a user with the capability to select a program for recording, wherein the selection can be made while the program content is being broadcasted.

BRIEF DESCRIPTION OF THE DRAWING(S)

DESCRIPTION OF THE ILLUSTRATIVE EMBODIMENT(S)

Figure 1:
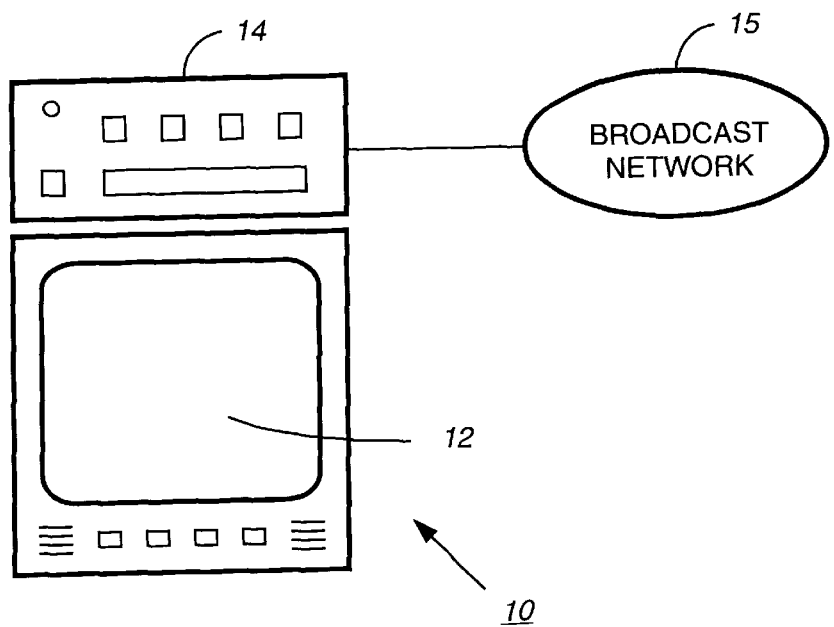
FIG. 1 is a block diagram of a receiver system with a user interface in accordance with one aspect of the invention.

Referring to FIG. 1, there is shown a block diagram of a receiver system 10 in accordance with one aspect of the invention. The system 10 comprises a monitor unit 12 for receiving and presenting audio and video programs to a user and a set-top box 14. The unit 12 can be a personal computer monitor or a common commercially-available television set or stereo system. The set-top box 14 receives digital information including audio or video signals and is connected to the unit 12 such that the received content is viewed and/or heard by the user. The unit 14 is connected to a network that provides over the air, DSS, Satellite, or cable digital signals or programming in accordance with a common protocol. The protocol can be any suitable digital signal transmission and reception protocol. In accordance with one aspect of the invention, the protocol provides for a portion of the signal to include data describing the content, uniquely identifying it before the content is received and played. In the network 15 programs are generally played several times (e.g., more than once a day).

Figure 2:
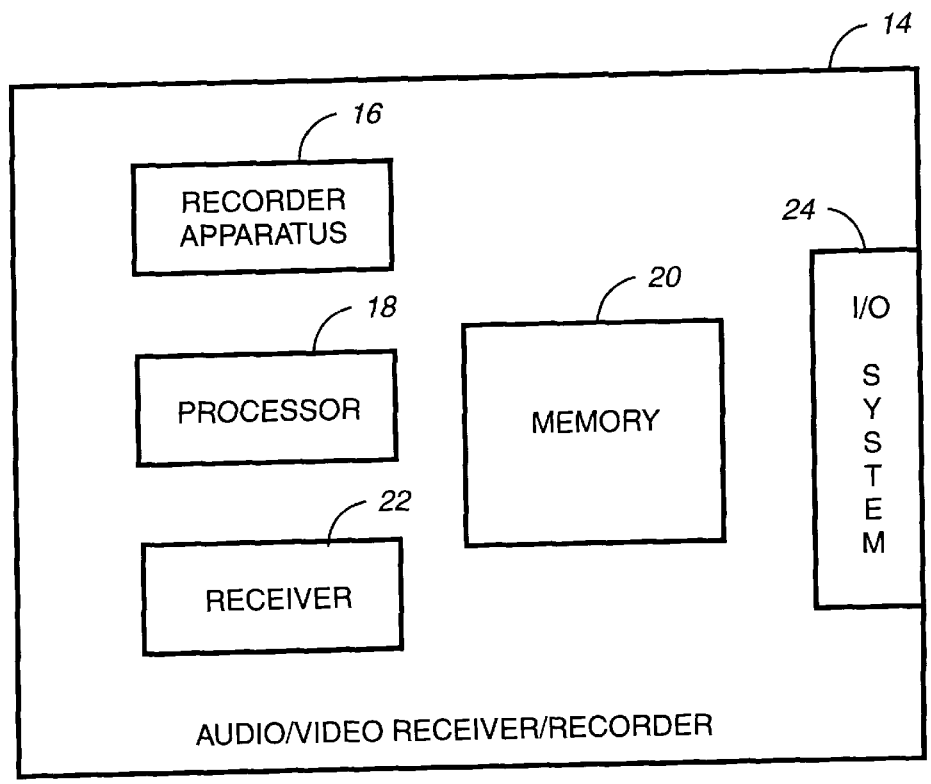
FIG. 2 shows a conceptual structure for a receiver/recorded in accordance with the invention.

Referring to FIG. 2, there is shown a simplified block diagram of a receiver/recorder unit 14, in accordance with the invention. The unit 14 comprises a recorder apparatus 16, a processor, memory, a receiver 22, and a user interface system 24. The recorder apparatus can be a device such as a common video cassette recorder or any other suitable recording apparatus capable of recording digital or analog signals and recording them on a tangible medium such as a video cassette, recordable CD, DVD, audio cassette, floppy diskettes, or hard disk drives. However, it should be appreciated that the recording device may be external to the receiver device and controlled via a wireless interface to the receiver device. The processor 18 can be any processor having sufficient processing power for the applications contemplated herein. The memory 20 is a subsystem, possibly comprising RAM, ROM, and/or disk information storage capacity. The receiver 22 is a common electronic circuit capable of receiving transmissions broadcasted over the network 15 over wire and/or air media. The I/O system 24 can include any of several user interface components such as a screen, speakers, mouse, keyboard, control buttons, infrared remote control device, or other I/O apparatus.

Figure 3:
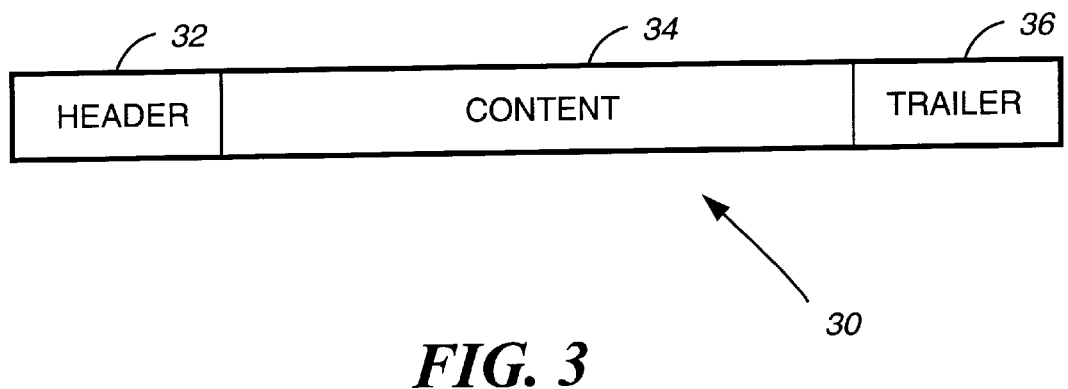
FIG. 3 shows a digital signal packet in accordance with the invention.

In FIG. 3 there is shown a simplified version of typical signal 30 received from the network 15. This signal comprises a header 32, the content 34, and a trailer 36. The header 32 comprises the data uniquely identifying the content 34 which follows. The trailer 36 comprises data indicating the end of the transmission. A typical digital transmission broadcast is composed of multiple signals or packets multiplexed together.

In operation, the unit 14 receives digital signals such as signal 30 containing program content via the interface provided at the receiver 22. The digital signals may be received in the form of packets according to any of several known protocols. The receiver may include circuitry and/or programming for demultiplexing and decoding the received signals. If the user finds a program interesting, he or she may choose to record the program. This is done by the user providing the unit 14 a command to record (e.g., by means of depressing a record button on a remote control) via the I/O system 24. In one embodiment, the processor 18 detects the record request, stores the program ID of the current signal in memory and causes the receiver 22 to monitor the broadcast transmission for a header matching the program ID stored in the unit's memory. The processor 18 then directs the recorder 16 to start recording, and when an end-of-program indicator in the received data stream is detected the processor directs the recorder 16 to stop recording.

In an alternate embodiment, the processor 18 may (responsive to a user's record request) generate programming instructions, stored in memory 20 for automatically causing the recorder to record the program in a subsequent transmission. The unit 14 could determine when the recording will occur by monitoring the broadcast stream for information providing a (machine-readable) program guide that indicates the times at which the uniquely identified program will be transmitted (e.g., VCR Plus format). The digital data identifying the subject content is used as a key to locate this information. The unit can also be programmed automatically to monitor periodically a network resource devoted to the program guide function or alternatively, the program header 32 could include information on subsequent broadcast times. Once the unit obtains the program guide information, the recording instructions are stored in memory 20 to carry out the programming command received from the user. This scheme may be implemented by building specialized apparatus or by programming commercially-available VCR circuitry having adequate memory resources to perform the above-discussed functionality.

Figure 6:
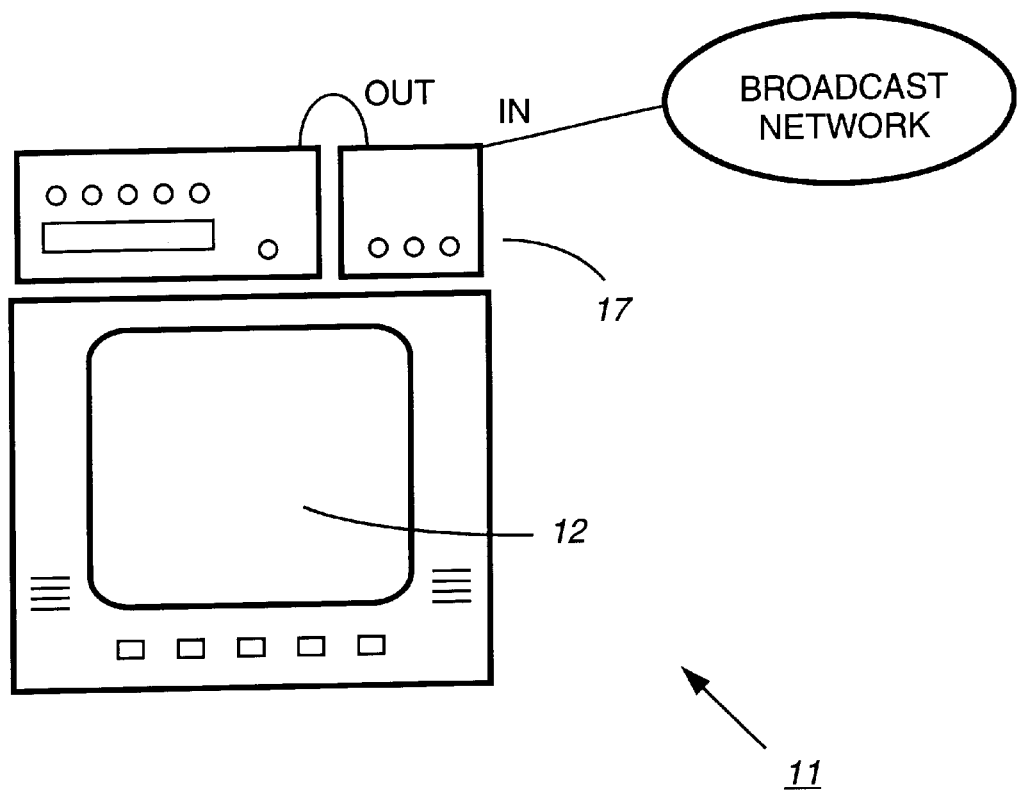
FIG. 6 is a block diagram of system according with another embodiment of the invention.

Referring to FIG. 6 there is shown a system 11 which is an alternate version of system 10 wherein a conventional VCR 13 is connected to a receiver unit 17. In this embodiment receiver 17 comprises the electronic components shown in FIG. 2 except that unit does not include a recorder 16. The VCR 13 comprises a recording apparatus, such as apparatus 16, along with a tuner and other conventional components. In this embodiment, the intelligence resides in the receiver 17 which receives the broadcasts, decodes the incoming data, and processes it for presentation to a user via the VCR 13 and the monitor 12.

Figure 4:
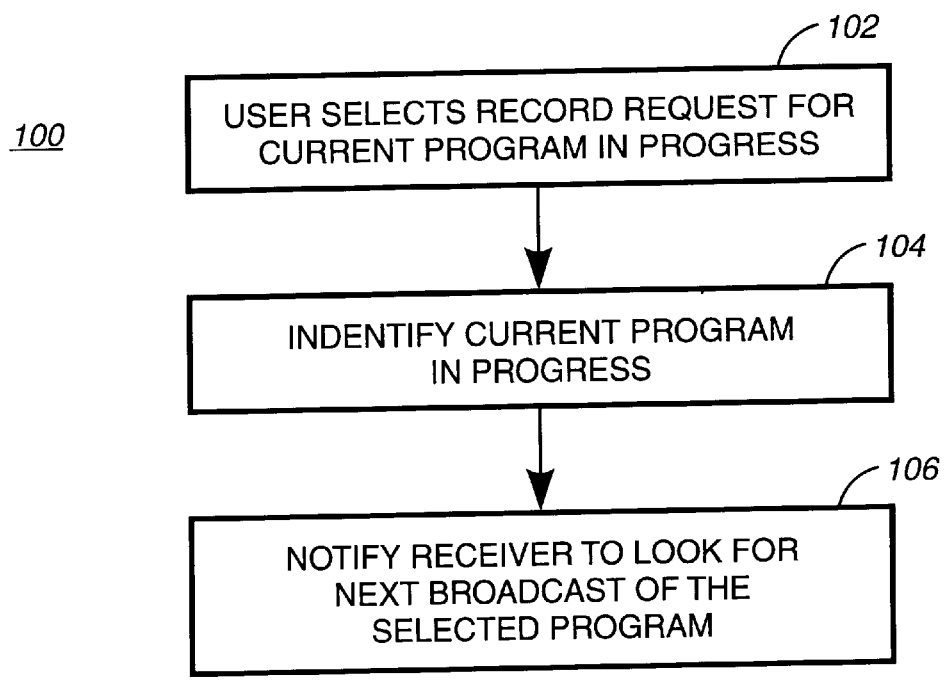
FIG. 4 is a flow chart illustrating a record set up method in accordance with the invention.

FIG. 4 is a flow chart illustrating a set-up method 100 in accordance with the invention. In step 102, the user selects a record request for a program being transmitted during its transmission. In step 104, the receiver unit uses the program identifier data to identify the program in progress that the user wants recorded. In step 106, the receiver is notified to look for the program identifier in the incoming data stream form the broadcast transmissions. At this point the system is ready to record when a match is made.

Figure 5:
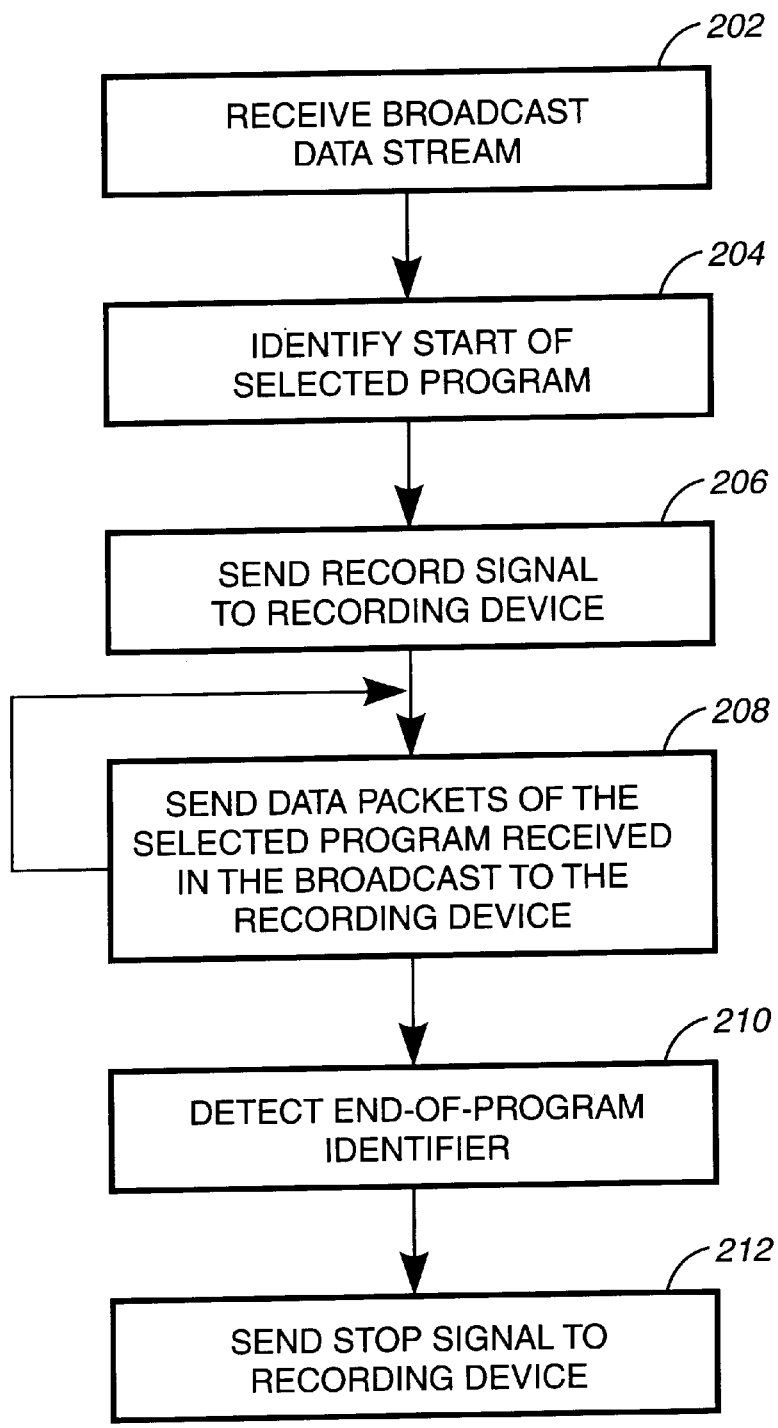
FIG. 5 is a flow chart illustrating a record method in accordance with the invention.

FIG. 5 is a flow chart illustrating a record method 200 in accordance with the invention. In step 202 the system receives the broadcast data stream. In step 204, the system identifies the start of the selected program using the identifier for the program content. In step 206, the system sends a record command to the recorder device (this is the equivalent of pressing a record button on a remote control). In step 208 the system sends data packets of the selected program received in the broadcast to the recording device. In step 210 an end-of-program identifier is detected at the receiver. At that time (in step 212) the receiver sends a stop signal to the recording device.

While the invention has been illustrated in connection with a preferred embodiment, it will be understood that many variations will occur to those of ordinary skill in the art, and that the scope of the invention is defined only by the claims appended hereto and equivalents.

What is claimed is:

1. A receiver unit for selecting and recording a program from broadcast transmissions presently being viewed, the broadcast transmissions comprising a plurality of programs and an identifier uniquely identifying each program transmitted in a broadcast network, the receiver unit comprising:

means for receiving a single command from a user to record a selected program presently being received at the receiver unit, and in response to the user command received, the receiver unit extracting from the program presently being viewed an identifier uniquely identifying the selected program;

monitor means for monitoring broadcast transmissions until the identifier is detected in the broadcast; and means for providing a record signal to a recorder to start recording responsive to detection of the identifier in the broadcast.

2. The receiver unit of claim 1 further comprising the recorder for recording information onto a storage medium.

3. The receiver unit of claim 2, wherein the recorder comprises apparatus for recording video cassettes.

4. The receiver unit of claim 2, wherein the recorder comprises apparatus for recording recordable compact disks.

5. The receiver unit of claim 2, wherein the recorder comprises apparatus for recording audio cassettes.

6. The receiver unit of claim 1 further comprising memory for storing a list of identifiers each identifying a program to be recorded.

7. The receiver unit of claim 6, wherein the monitor means comprises a processor programmed to detect the identifier for the selected program in the broadcast transmissions and to search for a match between an identifier stored in memory and each program identifier received in the broadcast transmissions.

8. The receiver unit of claim 1, wherein the communication unit comprises a computer apparatus comprising a processor and memory.

9. In a broadcast network wherein a broadcast data stream comprises a plurality of programs and an identifier uniquely identifying each program transmitted in a broadcast network, a method for generating a record signal based on a program being presented, the method comprising the steps of:

receiving the broadcast data stream;

presenting a program selected from the broadcast data stream;

receiving a single record command during the presentation of the program selected, and in response to the record command received, extracting from the program being presented an identifier uniquely identifying the selected program;

monitoring the broadcast data stream to find the identifier for the selected program; and sending a record signal to a recorder when the identifier for the selected program is found in the broadcast stream.

10. The method of claim 9, further comprising the step of recording the selected program.

11. The method of claim 9, further comprising the step of monitoring the broadcast data stream to find an end-of-program indicator for the selected program and sending a stop recording signal to the recorder upon finding the end-of-program indicator.

12. A program of instructions for programmable electronic apparatus for the selection and recording a program from broadcast transmissions presently being viewed, the program of instructions comprising a machine-readable medium comprising program instructions for:

receiving the broadcast data stream;

presenting a program selected from the broadcast data stream;

receiving a single record command during the presentation of the program selected, and in response to the record command received, extracting from the program being presented an identifier uniquely identifying the selected program;

monitoring the broadcast data stream to find the identifier for the selected program; and sending a record signal to a recorder when the identifier for the selected program is found in the broadcast stream.

13. The program of claim 12, further comprising an instruction for recording the selected program.

14. The program of claim 12, further comprising instructions for monitoring the broadcast data stream to find an end-of-program indicator for the selected program and sending a stop recording signal to the recorder upon finding the end-of-program indicator.

\* \* \* \* \*